(12) United States Patent
Haeberer et al.

(10) Patent No.: US 8,464,966 B2
(45) Date of Patent: Jun. 18, 2013

(54) DELIVERY MODULE FOR SELECTIVE CATALYTIC REDUCTION

(75) Inventors: Rainer Haeberer, Bretten (DE); Matthias Horn, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 103 days.

(21) Appl. No.: 12/521,385

(22) PCT Filed: Nov. 15, 2007

(86) PCT No.: PCT/EP2007/062413
§ 371 (c)(1),
(2), (4) Date: Sep. 21, 2010

(87) PCT Pub. No.: WO2008/080690
PCT Pub. Date: Jul. 10, 2008

(65) Prior Publication Data
US 2011/0016852 A1    Jan. 27, 2011

(30) Foreign Application Priority Data

Dec. 28, 2006  (DE) .......................... 10 2006 061 736

(51) Int. Cl.
*B01D 53/94* (2006.01)
*F01N 3/20* (2006.01)

(52) U.S. Cl.
USPC ............................... 239/128; 60/286; 60/295

(58) Field of Classification Search
USPC .............................. 60/286, 295, 303; 239/128
See application file for complete search history.

(56) References Cited

U.S. PATENT DOCUMENTS

| | | | |
|---|---|---|---|
| 6,845,611 B2 * | 1/2005 | Huthwohl et al. | 60/286 |
| 7,481,049 B2 * | 1/2009 | Huber et al. | 60/324 |
| 7,571,603 B2 * | 8/2009 | Ripper et al. | 60/286 |
| 7,644,577 B2 * | 1/2010 | Linna et al. | 60/286 |
| 2005/0284136 A1 | 12/2005 | Plougmann | |
| 2006/0168940 A1 | 8/2006 | Offenhuber et al. | |
| 2011/0016852 A1 | 1/2011 | Haeberer et al. | |

FOREIGN PATENT DOCUMENTS

| | | |
|---|---|---|
| DE | 10359522 A1 | 7/2005 |
| EP | 1435458 A1 | 7/2004 |
| FR | 2880064 A1 | 6/2006 |
| JP | 2007515581 A | 6/2007 |
| WO | WO 2006064028 A1 * | 6/2006 |
| WO | 2006072444 | 7/2006 |

* cited by examiner

*Primary Examiner* — Kenneth Bomberg
*Assistant Examiner* — Dapinder Singh
(74) *Attorney, Agent, or Firm* — Michael Best & Friedrich LLP

(57) ABSTRACT

The invention relates to a delivery module for a dosage system used to introduce a reducing agent into the exhaust gas tract of an internal combustion engine. The delivery module has a housing, which accommodates various components, and which is produced as an injection moulded component. A heating system is integrated in the vicinity of the center of the housing. The housing has at least one chamber for receiving additional components.

15 Claims, 3 Drawing Sheets

US 8,464,966 B2

DELIVERY MODULE FOR SELECTIVE CATALYTIC REDUCTION

CROSS-REFERENCE TO RELATED APPLICATION

This application is a 35 USC 371 application of PCT/EP 2007/062413 filed on Nov. 15, 2007.

BACKGROUND OF THE INVENTION

1. Field of the Invention

The invention relates to a delivery module for a dosage system used to introduce a reducing agent into the exhaust gas tract of an internal combustion engine.

2. Description of the Prior Art

In motor vehicles with internal combustion engines, because of the increasingly stringent laws regarding exhaust gases expected in the next few years, the pollutant NOx contained in the exhaust gas of internal combustion engines must be reduced. One currently used method for this is the SCR process (Selective Catalytic Reduction), in which the pollutant NOx is reduced to $N_2$ or $H_2O$, using liquid reducing agent. The reducing agent used, as a rule in liquid form, is received in a tank and is fed by a delivery module from the tank via a line to a metering module for injecting the reducing agent into the exhaust gas. The goal is to position the metering system, with its components, that is, tank delivery module lines, metering module, and the like, outside the passenger compartment of the motor vehicle, since at elevated temperatures, ammonia ($NH_3$) forms from the aqueous urea solution used as the reducing agent. With this concept of accommodating the entire metering system that carries the reducing agent outside the passenger compartment, it is assured that in the event of leaks in the metering system that carries the reducing agent, or in the event of an accident, no $NH_3$ formation can occur in the passenger compartment. Stringent demands are made of the delivery module, which includes such components as a pressure sensor, pump, scavenging valves, filter, heater, contact means of the components, and the like, in terms of being splashproof and being capable of fording flooded roads, and in particular of having corrosion resistance. Since the components of the metering system that carry the reducing agent are disposed outside the passenger compartment, they are exposed to a greater extent to temperature fluctuations and to the influence of splashing water and de-icing salt, in contrast to a disposition of those components in the passenger compartment.

These demands in terms of being splashproof and having fording ability as well as corrosion resistance are attended to, in systems used until now, by providing that the components of the entire metering system, that is, the aforementioned components comprising the tank delivery module, lines, and metering module, are accommodated in a separate housing. An internal cable harness connects the individual components to a central plug, which is mounted on the housing and by way of which the task of electrical contacting is shifted to the outside. The components accommodated inside the housing communicate with one another hydraulically via heatable hoses. These heatable hoses end at an inlet and outlet piece on the housing and are thus shifted to the hose connections outside the common housing. Once the components are mounted inside this housing, the housing is closed, sealed off from the environment with its components, via a separate lid. In a different concept for meeting this demand, all the components of the delivery module for the system carrying the reducing agent are embodied as individual components that are already splashproof and have fording ability. The individual components are mounted on a circuit board or mounting plate or the like and are sealed off by seals at an interface between the components and the plate. The hydraulic communication of the components is effected inside a plate or mounting block (circuit board). Each individual component designed to be splashproof and capable of fording flooded roads has its own contact means. A heater is also connected to the plate.

The embodiment described at the outset above is relatively large, since the individual components are accommodated in a common housing. Because of the hydraulic communication of the components with one another via hoses and because of the electrical triggering of the individual components with a central plug via a cable harness, the common housing in the first version sketched at the outset is extremely expensive and requires an extremely large amount of space. In addition to the components accommodated in a common housing, the hydraulic lines also each require heaters, which have an adverse effect on cost and space and in an individual case must be procured from the automobile manufacturer with regard to the required specifications. in the other versions it is a prerequisite that each of the individual components, on their own, meet the demands made for a component mounted outside the passenger compartment with regard to splashproofness, fording ability or corrosion resistance. This can be extremely complicated, since in the SCR process, some of the components are actuated via levers, as in the case of the reversing valve for the pump. An eccentric drive mechanism may be actuated by an actuation magnet or an electric drive mechanism. These are not compact, rotationally symmetrically embodied individual components that operate independently of one another; on the contrary, they are components which are in engagement with one another in manifold ways. This makes separate sealing for each component, as is known in the second embodiment previously chosen and known from the prior art, extremely difficult. Moreover, heating the components of an SCR system that are accommodated outside a common mounting block and received there proves extremely difficult, especially with regard to heat transfer from a heat source to the individual components received on a common mounting block.

SUMMARY AND ADVANTAGES OF THE INVENTION

According to the invention, it is proposed that a component of the metering system for introducing a reducing agent into the exhaust gas of an internal combustion engine be embodied as a primary component in such a way that further components can be integrated with the selected primary component in drawerlike or modular fashion, so that a compact complete unit is obtained. In practice, a reversing valve, for instance, which may for instance be a 4/2-way valve, can be selected as the primary component, in the housing of which drawerlike compartments or drawerlike chambers for the other components, such as a delivery module of the metering system, can be embodied for introducing a reducing agent into the exhaust gas of an internal combustion engine. According to the invention, it is proposed that the housing of the selected primary component be provided with a plurality of drawers. Since the housing of the primary component is fabricated economically, offering a high degree of design freedom, in the course of the plastic injection molding process, the chambers required for the drawers can be made relatively simply from plastic. Further components, such as a pressure sensor and at least one filter on the compression side, can easily be inserted into these drawers in the housing of the primary component. Once the applicable component has been built into the particular drawer provided for it in the housing of the primary component, individual chambers can be closed via separate plastic lids. The closure of the individual chambers via separate plastic lids can be done for instance by way of securing a lid to the drawer by means of a clip connection or screw connection or by embodying material-locking connection, for instance in the course of the plastic friction welding.

Depending on the degree of tightness of the individual chambers that is required, which depends on the component accommodated therein, elastomer seals can be let in between the chamber and the lid as seals. Elastomer seals may be dispensed with, for instance, if a material-locking connection is created along the opening of the chamber, receiving the drawer, in the housing of the primary component and in the lid that closes it. The electrical triggering of a component that is accommodated in its particular chamber in the housing of the primary component may be done for instance via a plug connection integrally injected onto the lid. Contacting of the component with the plug can be done via a pigtail connection, which can be plugged onto the particular component to be contacted electrically, between the component and the plug. Optionally, the plug housing integrally molded onto the lid can be provided with openings. If the particular component to be contacted electrically has plug prongs, then the plug, upon completion of the component and lid upon assembly can protrude from inward through the openings into the inner plug region and thus complete an electrical plug on the delivery module end.

Advantageously, a heater can be injection-molded into the housing of the primary component, which housing is preferably made in the course of the plastic injection molding process and in which the various chambers are embodied for receiving the drawers and components. If this heater is injection-molded directly into the plastic housing, then in contrast to a screwed-on heater, which is in contact at most at one point and thus can transmit heat via this one side in the course of the heat conduction, considerably better heat input into the drawers accommodated in the housing of the primary components, or in other words into the components integrated with these drawers, can be achieved.

BRIEF DESCRIPTION OF THE DRAWINGS

The invention is describe in further detail below in conjunction with the drawings, in which.

DESCRIPTION OF THE PREFERRED EMBODIMENTS

Figure 1:
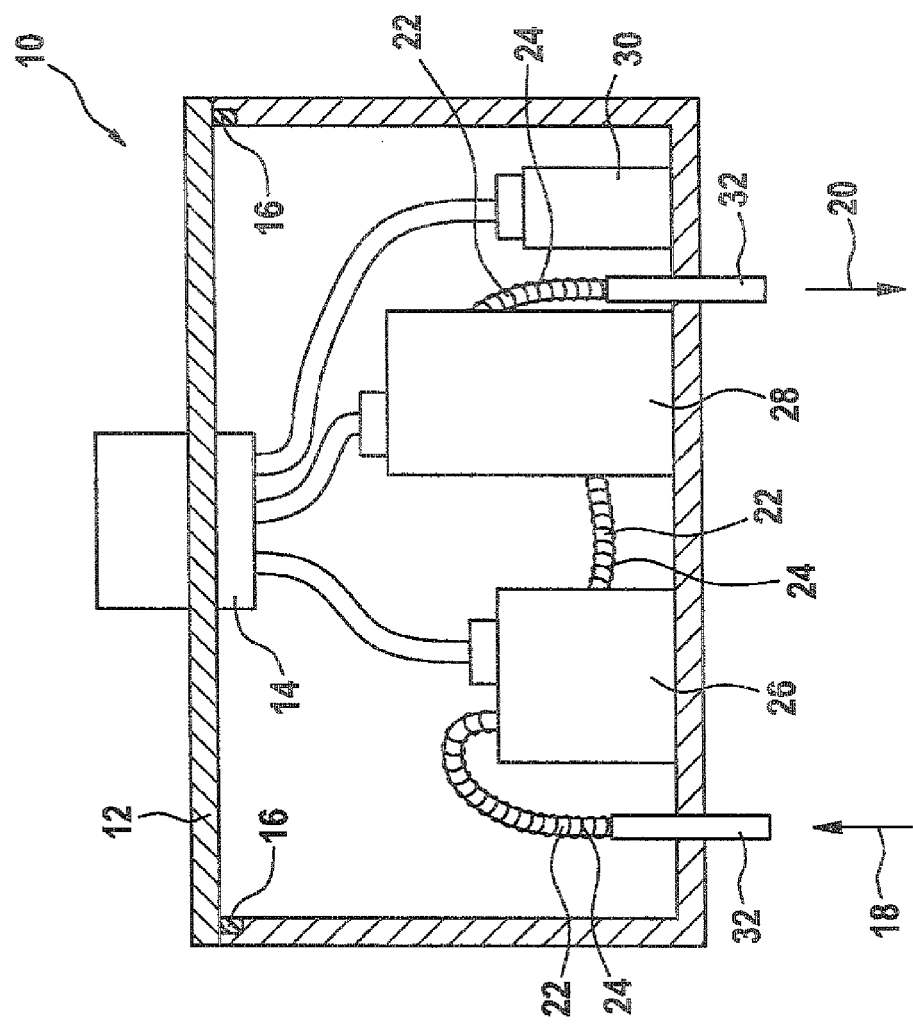
FIG. 1 shows an embodiment in accordance with the prior art, in which the components of the delivery module of a metering system are accommodated in a common housing that is sealed off from the outside and is electrically contacted.

In FIG. 1, a first embodiment of a delivery module according to the prior art can be seen in which the components of a delivery module of a metering system are integrated with a common housing that is sealed off from the outside.

It can be seen from FIG. 1 that a plurality of components 26, 28, 30 of a delivery module for delivering a reducing agent inside a metering system are disposed inside a central housing 10. In FIG. 1, the first component 26, second component 28, and third component 30 are secured to the bottom of the central housing 10. The central housing 10 is closed by a lid 12, which is sealed off by means of a sealing ring 16 extending all the way around. A central plug with a cable harness 14 is integrated with the lid 12, and by way of it the individual components 26, 28, 30 are electrically contacted inside the central housing 10. An inlet 18 extends into the central housing 10 through its bottom, and the reducing agent leaves the central housing 10 via a return 20. Both the inlet 18 and the return 20 each have a respective connection piece 32. The individual components 26, 28, 30 that are disposed inside the central housing 10 communicate with one another by hydraulic hoses 22, by way of which the reducing agent, via the inlet 18, reaches the inside of the first component 26 and from there the inside of the second component 28, to which the return 20 is connected via the connection piece 32. The hydraulic hoses 22 are each surrounded by a helical heating coil 24, which requires a relatively high heating capacity. The version shown in FIG. 1 is relatively large, since the components 26, 28, 30 are all accommodated in the central housing 10. Because of the hydraulic communication of the components 26, 28, 30 via hydraulic hoses 22 and the electrical triggering of the components by means of the cable harness 14 on the lid 12, this embodiment is extremely expensive and requires an extremely large amount of space. Both the hydraulic hoses 22 and the individual components 26, 28, 30 each require heaters, which with regard to the hydraulic hoses 22 can be formed by the heating coils 24. Separate heating elements are required for each of the components 26, 28, 30.

Figure 2:
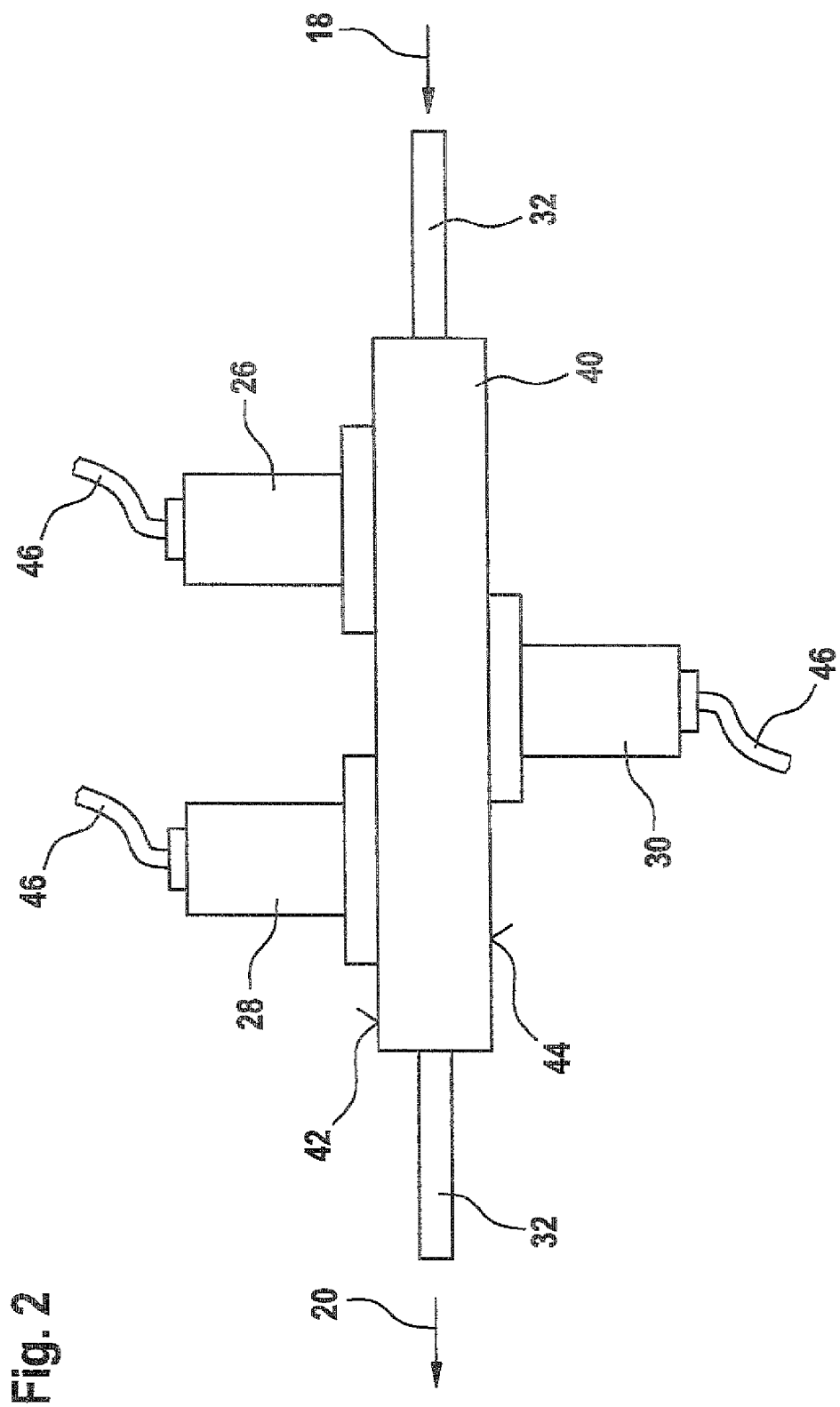
FIG. 2 shows a further embodiment in accordance with the prior art, in which individual components, each meeting exterior demands, are received on a common mounting block.

FIG. 2 shows an embodiment in which the individual components each meet the exterior demands and are received on a mounting block.

From FIG. 2, it can be seen that a mounting block 40 has one connection piece 32 each for one inlet 18 and one return 20 for a reducing agent. The mounting block 40 includes a first side 42, on which the first component 26 and the second component 28 of the delivery module for a reducing agent are received, while the third component 30 is located on a second side 44 of the mounting block 40. In this version, each of the components 26, 28, 30 associated with the sides 42, 44 of the mounting block 40 are independently splashproof, capable of fording flooded roads, and highly corrosion resistant, or in other words each meets the demands summarized in general by the term "exterior demands". It should also be noted that the components 26, 28, 30 shown in FIG. 2 are connected to the on-board electrical system of the motor vehicle via electrical contact means 46.

The embodiment shown in FIG. 2 has the prerequisite on the one hand that each of the components 26, 28 and 30 employed meet the exterior demands individually. However, in practice this can present problems, since in SCR metering systems, the components are actuated in part via levers (such as the reversing valve for pumps or eccentric elements) by an actuation magnet or an electric motor. Accordingly, they are not compact, rotationally symmetrical individual components that function independently of one another but on the contrary are components 26, 28, 30 that are in engagement with one another. Moreover, sealing each component separately against splashing water and flooded roads is extremely difficult and increases costs greatly. Moreover, heating the individual components proves extremely difficult, since the heat transfer by the mounting block 40 from it to the various components 26, 28, 30 disposed on the sides 42 and 44 can be done only on one side, which means that a great deal of heat is lost to the environment.

Figure 3:
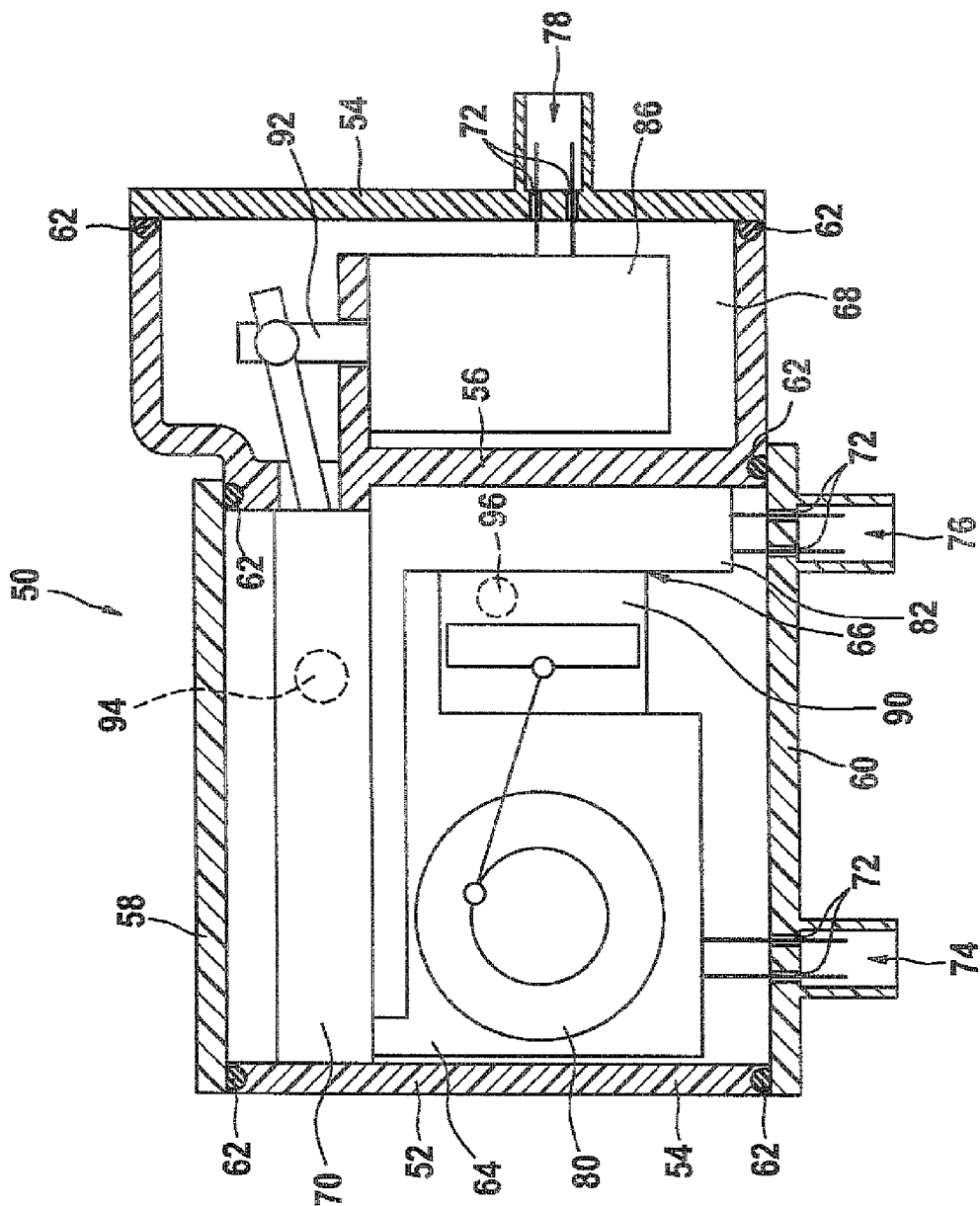
FIG. 3 shows a delivery module proposed according to the invention for a metering system for introducing a reducing agent, in which in the housing of a primary component, a plurality of further components of the delivery module of a metering system are accommodated.

From FIG. 3, a delivery module designed according to the invention can be seen, in which individual components are integrated with drawers or chambers.

From FIG. 3, it can be seen that a primary component of the delivery module 50 includes a plastic housing 52. The plastic housing 52 of the primary component is as a rule an injection-molded component, and it may be produced for instance by an aluminum injection molding process or a plastic injection molding process, which allows great freedom in terms of design with regard to the geometry and the subdivision of the housing 52 into individual chambers or drawers. The housing 52, shown in section in FIG. 3, which is preferably a housing made in the course of the plastic injection molding process, includes outer housing walls 54, at least one inner wall 56, a lid 58 that is removable from the housing 52, and a bottom face identified by reference numeral 60.

The delivery module 50 shown in FIG. 3 is a selected primary component of a metering system for introducing a reducing agent into the exhaust system of an internal combustion engine. The 4/2-way valve shown here as an example serves as a reversing valve 70, with whose housing 52 the components described in further detail hereinafter are integrated in modular fashion. The housing 52 in which the reversing valve 70 is accommodated simultaneously, in the embodiment proposed according to the invention, forms the housing for the other components of the delivery module 50. The delivery module 50 includes further components, such as at least one pressure sensor and a filter, disposed on the compression side, for filtering the reducing agent. Via the filter provided on the compression side, it is assured that only particle-free reducing agent is metered into the exhaust system of the engine.

The delivery module 50 is in turn a component of a metering system, which besides the delivery module 50 also includes a metering module, in which a metering valve, not shown in conjunction with the present invention, is accommodated.

It can be seen from FIG. 3 that the bottom face 60, for instance, of the selected primary component, that is, the delivery module 50, has a seal 62, by way of which the outer housing walls 54 placed on the bottom face 60 are sealed off.

In the housing 52 of the primary component selected, that is, the delivery module 50, a first chamber 64 is embodied, which can also be called a drawer. Also located inside the housing 52, which is preferably produced in the course of the plastic injection molding process, is a second chamber 66, which serves to receive a heater 82. Finally, it can be seen from FIG. 3 that a third chamber 68 is separated from the first chamber 64 by the inner wall 56. The chambers 64, 66, 68, which can also be called drawers, represent separate receiving chambers for the further components to be accommodated in the housing 52 of the selected primary component, that is, the delivery module 50. These further components are for instance a drive mechanism 80, which as a rule is an electric drive mechanism; the heater 82 already mentioned; and an actuation magnet 86 as well as a pump 90.

Also accommodated in the delivery module 50 are the components, not shown in further detail in FIG. 3, comprising a pressure sensor and a filter on the compression side. Analogously to the components already listed, that is, the drive mechanism 80, heater 82, actuation magnet 86 and pump 90, these can be accommodated in separate chambers of the housing 52 of the delivery module 50.

In the case of the housing 52 shown in section in FIG. 3 and preferably produced in the course of the plastic injection molding process, the heater 82 can either be introduced into the second chamber 66, embodied separately in the interior of the housing 52, or it can already be injection-molded into the housing in the course of production of the housing 52. Both embodiment possibilities are feasible. Disposing the heater 82 in the center of the hollow space in the housing 52—as shown in FIG. 3—offers the possibility that the heat produced by the heater 82 can simultaneously, in the course of the heat conduction or by convection, be transferred to the components comprising the drive mechanism 80, actuation magnet 86 and pump 90 that are disposed in the interior of the housing in the various chambers 64, 66 and 68, without requiring separate lines for this purpose. The embodiment proposed by the invention offers the advantage that given a suitable disposition and suitable configuration of the heater 82 and its physical contact with the reversing valve 70 or the inner wall 56, very good, uniformly effective heating of the housing 52 can be achieved. While in the case of the heater 82 as shown in FIG. 3, heat transfer from heat conduction is effected between the horizontally extending leg of the heater 82 and the housing of the reversing valve 70 and heat transfer also takes place in the course of heat conduction from the leg, bent by 90°, of the heater 82 via the inner wall 56 to the actuation magnet 86 disposed in the third chamber 68, a heat transfer is established in the course of convection from the top side of the leg, bent by 90°, to the pump 90 and to the drive mechanism 80 received in the first chamber 64.

The chambers 64, 66, 68 shown in FIG. 3 may be closed by lid elements, for instance. The lid elements can either be joined materially to the housing 52 via material-locking connection after the introduction of the various components 80, 90, 86 and 70 into the chambers 64, 66, 68, intended for them, in the interior of the housing 52, so that the components disposed in the various chambers 64, 66, 68 are sealed off from environmental factors such as splashing water, de-icing salt, dirt, and so forth; that is, they meet all of the "exterior demands" made of them. Securing the lids that close the chambers 64, 66, 68 can moreover be done via clip connections or screw connections or the like. Depending on the degree of tightness regard to external environmental factors that is required of the individual chambers 64, 66, 68, elastomer seals (see reference numeral 62) may also be used. The electrical triggering, for instance of the actuation magnet 86 or of the drive mechanism 80, can be effected both via plug contacts embodied in each of the lids that close the respective chambers 68 and 64, or—as shown in FIG. 3—via plug prongs 72, which pass through openings 74, 76, 78 in the bottom face 60 or in an outer housing wall 54. Ideally, the plug prongs 72, for instance of the drive mechanism 80, heater 82, or also the actuation magnet 86, after passing through the openings 74, 76, 78 in the bottom face 60 or the outer housing wall 54 end in plug modules, by way of which the various components 80, 82 and 86 to be electrically contacted can be electrically contacted. The plug prongs 72 of the components 80, 86 and 90 to be contacted electrically, to name these examples, extend from the inside of the housing 52 through the housing openings 74, 76, 78 in the outer housing wall 54 or the bottom face 60 into corresponding plug contacts, on which the housing 52 of the reversing valve 70, selected as a primary component and having the nature of a 4/2-way valve, is embodied.

For the sake of completeness, it will be noted that the housing 52 of the reversing valve 70 embodied as a 4/2-way valve, with the first chamber 64, the second chamber 66, and the third chamber 68, offers receiving chambers both for the components 80, 82 and for the components 86 and 90. The actuation magnet 86 is likewise electrically contacted via plug contacts 72 that extend through housing openings 78 in the outer housing wall 54 and has a tappet 92. The tappet 92 is rotatably connected to a lever, by way of which in turn the reversing valve 70, which may for instance be embodied as a 4/2-way valve, is actuatable.

Thus after the selection of a primary component of the delivery module 50, whose housings 52 embody chambers 64, 66, 68 or drawers serving as housings for further components 80, 82, 86 and 90, offers the advantage that components interacting with one another, such as the actuation magnet 86 and the reversing valve 70, can likewise meet the exterior demands, since they are adequately encapsulated and durably protected against environmental factors, such as the parameters listed at the outset, that is, splashing water, flooded roads, de-icing salt, and corrosion. In the embodiment shown in FIG. 2, the exterior demands can be met only at comparatively high effort and expense, since the components 26, 28, 30 received there on the sides 42, 44 of the mounting block 40 are exposed to the environmental factors virtually without protection from them.

The foregoing relates to the preferred exemplary embodiments of the invention, it being understood that other variants and embodiments thereof are possible within the spirit and scope of the invention, the latter being defined by the appended claims.

The invention claimed is:

1. A delivery module for a metering system for introducing a reducing agent into an exhaust system of an internal combustion engine, comprising a housing having first, second and third chambers in which components are accommodated, the housing being manufactured as an injection-molded component, said housing further having a reversing valve, the first chamber including an electric drive mechanism and a pump, the second chamber including a heater, and the third chamber including an actuation magnet that actuates the reversing valve.

2. The delivery module as defined by claim 1, wherein the housing is produced as an injection-molded component by a plastic injection molding process or by an aluminum injection molding process.

3. The delivery module as defined by claim 1, wherein the heater is either disposed in the housing in a position that promotes heat conduction and heat radiation or is disposed near the center of the housing.

4. The delivery module as defined by claim 2, wherein the heater is either disposed in the housing in a position that promotes heat conduction and heat radiation or is disposed near the center of the housing.

5. The delivery module as defined by claim 1, wherein components to be contacted electrically are mounted in their corresponding chambers in the housing each have plug prongs passing through respective housing openings.

6. The delivery module as defined by claim 2, wherein components to be contacted electrically are mounted in their corresponding chambers in the housing each have plug prongs passing through respective housing openings.

7. The delivery module as defined by claim 3, wherein components to be contacted electrically are mounted in their corresponding chambers in the housing each have plug prongs passing through respective housing openings.

8. The delivery module as defined by claim 1, further comprising an actuating device extending between the actuating magnet in said third chamber and said reversing valve in said first chamber.

9. The delivery module as defined by claim 5, further comprising an actuating device extending between the actuating magnet in said third chamber and said reversing valve in said first chamber.

10. The delivery module as defined by claim 1, wherein at least one inner wall extends inside the housing, separating at least said second and third chambers from one another and promoting heat transfer by heat conduction between said second and third chambers.

11. The delivery module as defined by claim 8, wherein at least one inner wall extends inside the housing, separating at least said second and third chambers from one another and promoting heat transfer by heat conduction between said second and third chambers.

12. The delivery module as defined by claim 1, wherein at least said first chamber is closable by a lid element, which lid element is either clipped, screwed, or mounted in material-locking fashion to the at least said first chamber at an access opening.

13. The delivery module as defined by claim 2, wherein at least said first chamber is closable by a lid element, which lid element is either clipped, screwed, or mounted in material-locking fashion to the at least said first chamber at an access opening.

14. The delivery module as defined by claim 1, wherein the housing has both an inlet and at least one return for reducing agent to be introduced into the exhaust system of the engine.

15. The delivery module as defined by claim 1, wherein said reversing valve as comprises a 4/2-way valve.

* * * * *

UNITED STATES PATENT AND TRADEMARK OFFICE
CERTIFICATE OF CORRECTION

PATENT NO. : 8,464,966 B2  
APPLICATION NO. : 12/521385  
DATED : June 18, 2013  
INVENTOR(S) : Haeberer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this
Eighth Day of September, 2015

Michelle K. Lee
*Director of the United States Patent and Trademark Office*